United States Patent
Numata

[11] Patent Number: 5,907,635
[45] Date of Patent: *May 25, 1999

[54] PICTURE DATA DECOMPRESSION APPARATUS

[75] Inventor: Kohji Numata, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/506,975

[22] Filed: Jul. 28, 1995

[30] Foreign Application Priority Data

Jul. 28, 1994 [JP] Japan .................................. 6-176364

[51] Int. Cl.$^6$ .............................. G06K 9/36; G06K 9/38; G06K 9/46; H04N 7/12
[52] U.S. Cl. ..................... 382/233; 382/232; 382/234; 382/246; 382/251; 348/403; 348/416
[58] Field of Search ........................... 382/233, 234, 382/246, 248, 250, 251, 232; 348/403, 416, 401, 402, 407

[56] References Cited

U.S. PATENT DOCUMENTS

| | | | |
|---|---|---|---|
| 5,008,951 | 4/1991 | Koshi | 382/234 |
| 5,379,070 | 1/1995 | Retter et al. | 348/403 |
| 5,386,233 | 1/1995 | Keith | 348/407 |
| 5,416,606 | 5/1995 | Katayama et al. | 382/232 |
| 5,426,462 | 6/1995 | Bui | 348/401 |
| 5,453,788 | 9/1995 | Matsushima et al. | 382/246 |
| 5,510,840 | 4/1996 | Yonemitsu et al. | 348/402 |
| 5,579,052 | 11/1996 | Artieri | 348/416 |
| 5,592,399 | 1/1997 | Keith et al. | 364/514 R |

FOREIGN PATENT DOCUMENTS 4-137975  5/1992  Japan .

*Primary Examiner*—Bipin Shalwala
*Assistant Examiner*—Daniel G. Mariam
*Attorney, Agent, or Firm*—Sughrue, Mion, Zinn, Macpeak & Seas, PLLC

[57] ABSTRACT

The invention provides a picture data decompression apparatus which reduces the time required for decompression of picture data and operates at a high speed. The picture data decompression apparatus includes a module switching section for extracting code patterns in units of n bits the compressed picture data, m decoding and dequantization modules, and an inverse orthogonal transform section for inverse orthogonal transforming decoded and dequantized data from the m decoding and dequantization means. Each of the decoding and dequantization modules decodes and dequantizes, from a code pattern in units of n bits extracted by the module switching section, only a predetermined variable length code of a single unique code pattern of n bits from among m different predetermined patterns. Each of the decoding and dequantization modules performs storage into the dequantized data buffer in order of coded coefficients without performing scanning conversion, and the inverse orthogonal transform section reads out the stored data of the dequantized data buffer designating an address and performs inverse orthogonal transform processing of the thus read out data.

4 Claims, 13 Drawing Sheets

FIG. 4

| | | |
|---|---|---|
| CODE PATTERN (1) | 1 1 1 0 1 1 1 | 0 0 |
| CODE PATTERN (2) | 1 1 1 0 1 1 1 | 0 1 — NOT SPECIFIED IN CODE TABLE |
| CODE PATTERN (3) | 1 1 1 0 1 1 1 | 1 1 |
| CODE PATTERN (4) | 1 1 1 0 1 1 1 | 1 0 — SPECIFIED IN CODE TABLE |

SPECIFIED IN CODE TABLE    SPECIFIED IN CODE TABLE

FIG. 5

| dct_coeff_first and dct_coeff_next variable length code (NOTE1) | run | level |
|---|---|---|
| 10 | end_of_block | |
| 1 s (NOTE2) | 0 | 1 |
| 11 s (NOTE3) | 0 | 1 |
| 011 s | 1 | 1 |
| 0100 s | 0 | 2 |
| 0101 s | 2 | 1 |
| 0010 1 s | 0 | 3 |
| 0011 1 s | 3 | 1 |
| 0011 0 s | 4 | 1 |
| 0001 10 s | 1 | 2 |
| 0001 11 s | 5 | 1 |
| 0001 01 s | 6 | 1 |
| 0001 00 s | 7 | 1 |
| 0000 110 s | 0 | 4 |
| 0000 100 s | 2 | 2 |
| 0000 111 s | 8 | 1 |
| 0000 101 s | 9 | 1 |
| 0000 01 | escape | |
| 0010 0110 s | 0 | 5 |
| 0010 0001 s | 0 | 6 |
| 0010 0101 s | 1 | 3 |
| 0010 0100 s | 3 | 2 |
| 0010 0111 s | 10 | 1 |
| 0010 0011 s | 11 | 1 |
| 0010 0010 s | 12 | 1 |
| 0010 0000 s | 13 | 1 |
| 0000 0010 10 s | 0 | 7 |
| 0000 0011 00 s | 1 | 4 |
| 0000 0010 11 s | 2 | 3 |
| 0000 0011 11 s | 4 | 2 |
| 0000 0010 01 s | 5 | 2 |
| 0000 0011 10 s | 14 | 1 |
| 0000 0011 01 s | 15 | 1 |
| 0000 0010 00 s | 16 | 1 |

NOTES
1- The last bit 's' denotes the sign of the level. '0' for positive '1' for negative.
2- This code shall be used for dct_coeff_first.
3- This code shall be used for dct_coeff_next.

DATA WRITING ORDER

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |

DATA WRITING ORDER

| 1 | 9 | 2 | 3 | 10 | 17 | 25 | 18 |
|---|---|---|---|---|---|---|---|
| 11 | 4 | 5 | 12 | 19 | 26 | 33 | 41 |
| 34 | 27 | 20 | 13 | 6 | 7 | 14 | 21 |
| 28 | 35 | 42 | 49 | 57 | 50 | 43 | 36 |
| 29 | 22 | 15 | 8 | 16 | 23 | 30 | 37 |
| 44 | 51 | 58 | 59 | 52 | 45 | 38 | 31 |
| 84 | 32 | 39 | 46 | 53 | 60 | 61 | 54 |
| 47 | 58 | 40 | 48 | 55 | 62 | 56 | 64 |

DATA WRITING ORDER

| 1 | 2 | 6 | 7 | 15 | 16 | 28 | 29 |
|---|---|---|---|----|----|----|----|
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 53 | 64 |

DATA READING OUT ORDER

| 1 | 9 | 2 | 3 | 10 | 17 | 25 | 18 |
|---|---|---|---|----|----|----|----|
| 2 | 10 | 5 | 12 | 19 | 26 | 33 | 41 |
| 3 | 11 | 20 | 13 | 6 | 7 | 14 | 21 |
| 4 | 12 | 42 | 49 | 57 | 50 | 43 | 36 |
| 5 | 13 | 15 | 8 | 16 | 23 | 30 | 37 |
| 6 | 14 | 58 | 59 | 52 | 45 | 38 | 31 |
| 7 | 15 | 39 | 46 | 53 | 60 | 61 | 54 |
| 8 | 16 | 40 | 48 | 55 | 62 | 56 | 64 |

PICTURE DATA DECOMPRESSION APPARATUS

BACKGROUND OF THE INVENTION

1. Field of the Invention

This invention relates to a coding and decoding system for picture data which employs orthogonal transform which is one of high efficiency compression coding methods, and more particularly to a picture data decompression apparatus which decompresses compressed picture data obtained by orthogonal transform, quantization and variable length coding of original picture data at a high speed.

2. Description of the Related Art

A procedure of processing of a conventional picture data decompression apparatus is illustrated in FIG. 12.

Referring to FIG. 12, compressed picture data are first read in at step S121, and then at step S122, a header of the compressed picture data is analyzed to extract information necessary for decompression of the picture data such as a picture size, a number of blocks to be processed and so forth. Then at step S123, variable length codes of the compressed picture data are decoded in units of one block to obtain quantized orthogonal transform coefficients. At subsequent step S124, the quantized orthogonal transform coefficients are dequantized, and then at step S125, data obtained by such dequantization are written for one block into a memory, and the thus written data are read out from the memory. At step S126, the data thus read out are processed by inverse orthogonal transform to obtain picture data for one block.

The operations from the decoding processing of variable length codes at step S123 to the inverse orthogonal transform processing at step S126 are repeated for all of the blocks extracted in the header analysis processing at step S122 until it is determined at step S127 that processing for all of the blocks has been completed. Then at step S128, the picture data for one frame are written into a frame memory, and then the compressed picture data are decompressed. In this instance, in the decoding processing of variable length codes at step S123, compressed code bits are cut out by a plural number and compared with a code table, and when a coincident bit pattern is found out in the code table, coefficient data corresponding in a one-by-one corresponding relationship to the bit train in the code table can be determined. When no coincident bit pattern is found out in the code table, an additional bit is cut out, and the formerly cut out bits with the additional bit are compared with the code table again. After coefficient data are determined, they are multiplied by a quantization value for dequantization to obtain input data for inverse orthogonal transform.

Further, in the data writing and reading out processing at step S125, the data are written into the memory in order indicated by the numbers of the data construction in the block illustrated in FIG. 13, and data to be used for inverse orthogonal transform are read in order in the vertical direction and the horizontal direction of the block.

In the conventional picture data decompression method described above, a compressed code bit train is cut out by a plurality of bits, and the pattern of the thus cut out bits is compared with a code table. Then, if a coincident pattern is not found out in the code table, then the processing of cutting out a further plurality of bits from the compressed code bit train and comparing the thus cut out bits with the code table again is repeated until a coincident pattern is found out in the code table. Consequently, the conventional picture data compression method is disadvantageous in that it requires much processing time.

Further, in order to write data, which remain arranged in order as zigzag-scanned on the coding side, into a memory after dequantization, processing of scanning conversion is required, and the memory is accessed in units of one coefficient. Consequently, the conventional picture data decompression method has disadvantages also in that a very great number of processing steps are required for the microprocessor and also accessing to the memory is complicated, resulting in much processing time.

SUMMARY OF THE INVENTION

It is an object of the present invention to provide a picture data decompression apparatus which can decompress compressed data at a high speed.

In order to attain the object described above, according to the present invention, there is provided a picture data decompression apparatus for decompressing compressed picture data obtained by orthogonal transform, quantization and variable length coding of original picture data, comprising code pattern extraction means for extracting code patterns in units of n bits from the compressed picture data, n being an integral number greater than 1, m decoding and dequantization means each for decoding and dequantizing a code pattern from the code pattern extraction means, m being an integral number greater than 1, and inverse orthogonal transform means for inverse orthogonal transforming decoded and dequantized data from the m decoding and dequantization means, each of the decoding and dequantization means decoding and dequantizing, from a code pattern of n bits extracted by the code pattern extraction means, only a predetermined variable length code of a single unique code pattern of n bits from among m different predetermined patterns.

Preferably, the code pattern extraction means includes a compressed code buffer for storing the compressed picture data, a table for defining a corresponding relationship between the m code patterns of n bits and the m decoding and dequantization means, and switching means for extracting the picture data stored in the compressed code buffer as a code pattern in units of n bits and inputting the thus extracted code pattern into a corresponding one of the decoding and decompression means referring to the table.

Preferably, the picture data decompression apparatus further comprises a dequantized data buffer for storing decoded and dequantized data from the m decoding and dequantization means, and each of the decoding and dequantization means includes a buffer address calculation section for calculating a storage address to the dequantized data buffer from a run length of a coded coefficient represented by all or some of bits of a code pattern of n bits inputted thereto, a dequantization calculation section for performing dequantization calculation of a level of a coded coefficient represented by all or some of bits of a code pattern of n bits inputted thereto referring to the dequantization table, and an extraction pointer updating section for updating an extraction pointer for the compressed code buffer by a number equal to a number of effective bits used by the buffer address calculation section and the dequantization calculation section from within a code pattern of n bits inputted thereto.

Preferably, each of the decoding and dequantization means performs storage into the dequantized data buffer in order of coded coefficients without performing scanning conversion, and the inverse orthogonal transform means reads out the stored data of the dequantized data buffer designating an address and performs inverse orthogonal transform processing of the thus read out data.

In the picture data decompression apparatus, the m different code patterns in units of n bits are decoded and dequantized simultaneously for individual code patterns by the m decoding and dequantization means, the code patterns can be decoded at a comparatively small number of steps, and consequently, the entire decompression processing can be performed at a higher speed than ever.

Further, one or a plurality of coefficients regarding data after decoding and decompression processing are stored in order of addresses into the memory without performing scanning conversion simultaneously, and upon inverse orthogonal transform, data are read in designating an address and inverse orthogonal transform of the thus read in data is performed. Consequently, decompression processing can be performed at a high speed without the necessity of processing of scanning conversion upon writing.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 4 is a diagrammatic view illustrating several code patterns handled in the picture data decompression apparatus of FIG. 1 from among 512 different 9-bit code patterns;

FIG. 5 is a table illustrating the relationship between a variable code, a run and a level prescribed in the MPEG;

DESCRIPTION OF THE PREFERRED EMBODIMENT

Figure 1:
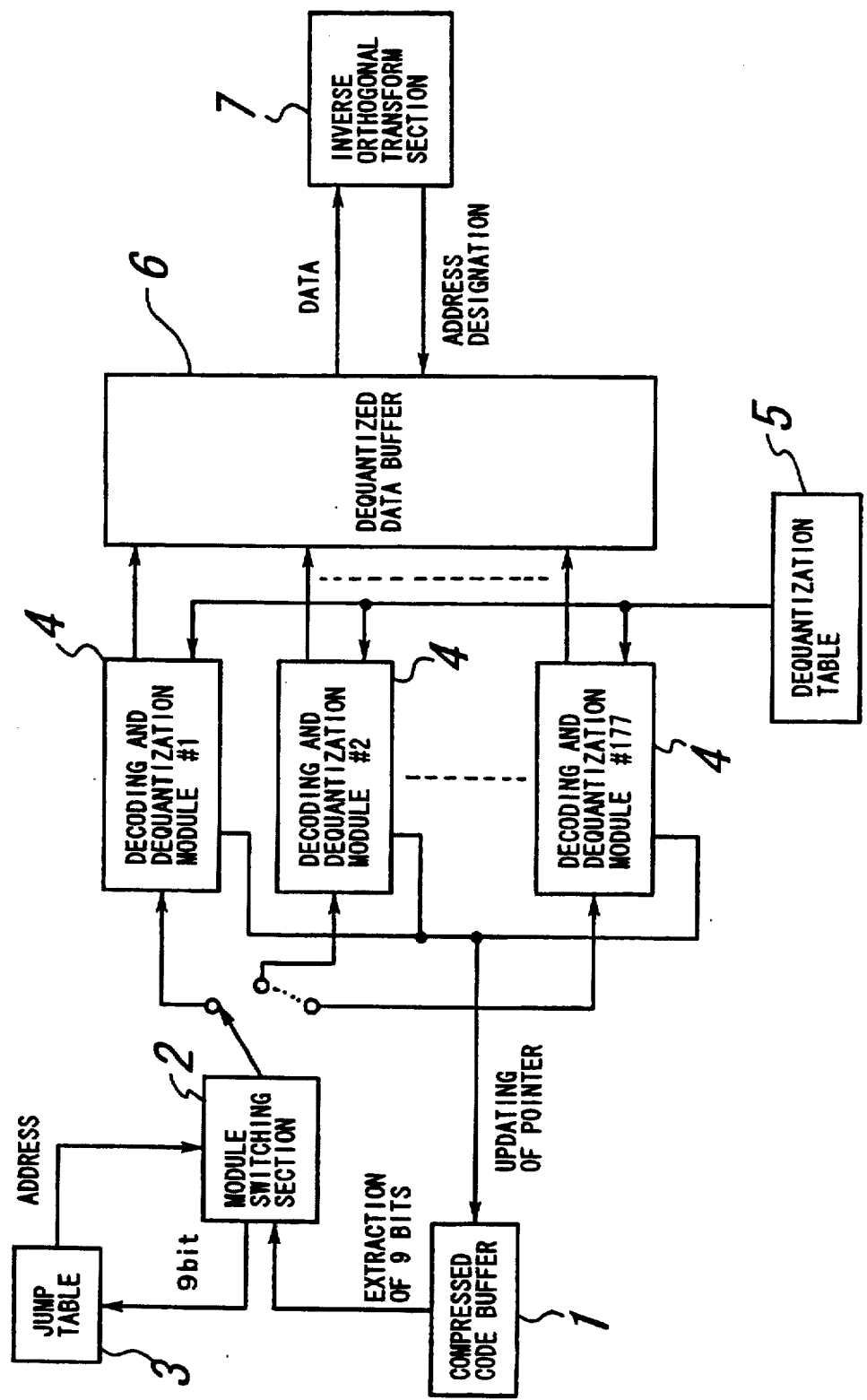
FIG. 1 is a block diagram showing an entire construction of a picture data decompression apparatus according to a preferred embodiment of the present invention.

Referring first to FIG. 1, there is shown an entire construction of a picture data decompression apparatus according to a preferred embodiment of the present invention. The picture data decompression apparatus shown includes a compressed code buffer 1, a module switching section 2, a jump table 3, m decoding and dequantization modules 4, a dequantization table 5, a dequantized data buffer 6, and an inverse orthogonal transform section 7.

The compressed code buffer 1 stores compressed picture data obtained by orthogonal transform, quantization and variable length coding. The picture data are in the form of variable length codes coded by Huffman coding of picture data in order of zigzag scanning in units of a block of 8×8 picture elements discriminating a run which is a number of preceding coefficients of zero and a level which is a value of a non-zero quantized orthogonal transform coefficient.

The module switching section 2 extracts picture data stored in the compressed code buffer 1 in a code pattern in units of n bits and inputs the thus extracted code pattern into a corresponding one of the decoding and dequantization modules 4 referring to the jump table 3. Code patterns which are processed by the m decoding and dequantization modules 4 are different from one another, and when the code pattern extracted from the compressed code buffer 1 is, for example, "001001000" of 9 bits, the module switching section 2 extracts an address corresponding to the code pattern from the jump table 3, selects one of the decoding and dequantization modules 4 in accordance with the address and inputs the code pattern into the thus selected decoding and dequantization module 4.

Figure 2:
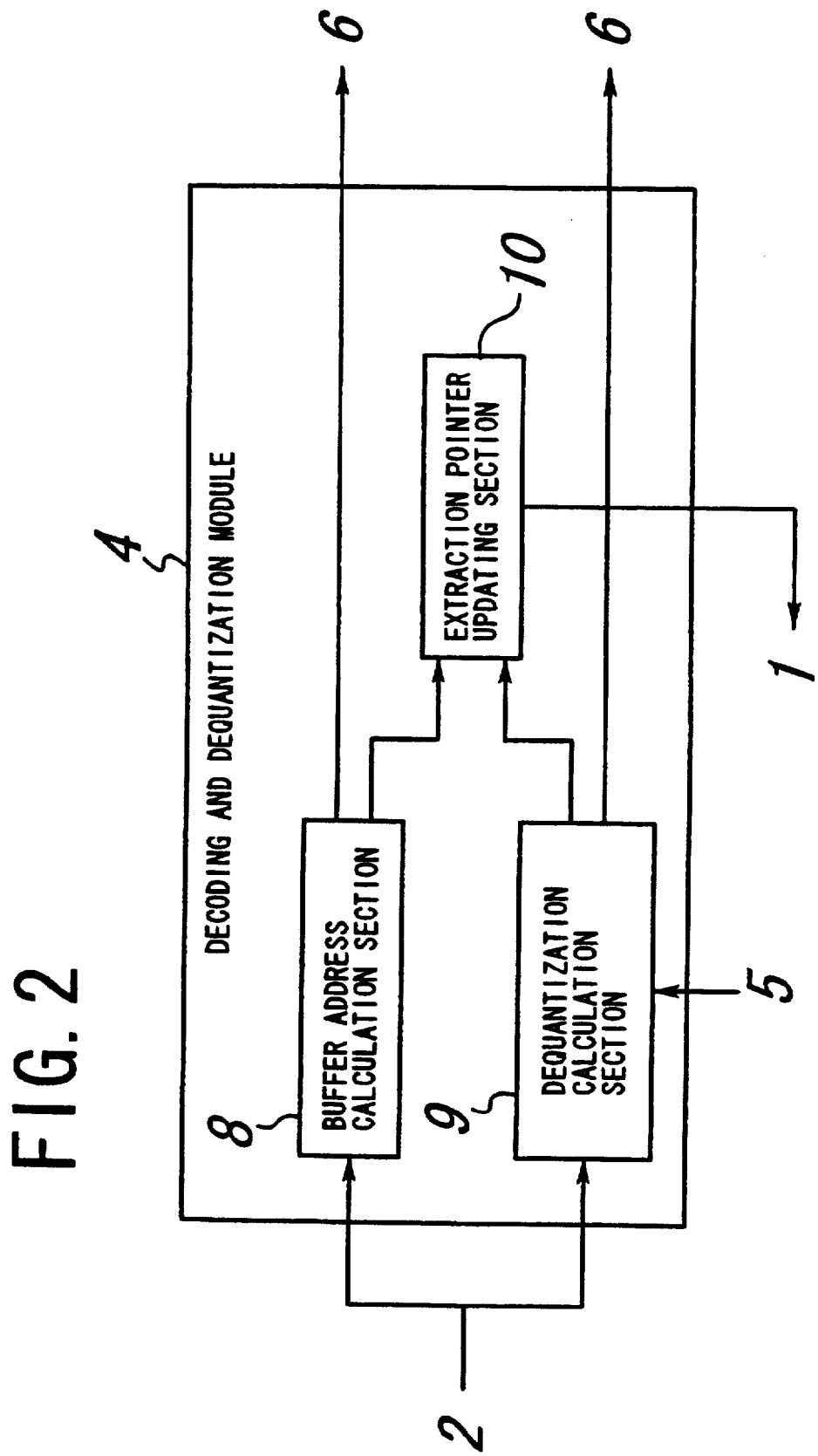
FIG. 2 is a block diagram illustrating different functions of a decoding and dequantization module in the picture data decompression apparatus of FIG. 1.

Each of the decoding and dequantization modules 4 has a module configuration by which a code pattern of n bits can be processed at a time and includes, from its functions, as shown in FIG. 2, a buffer address calculation section 8 for calculating a storage address to the dequantized data buffer 6 from a run length of a coded coefficient represented by all or some of bits of a code pattern of n bits inputted thereto, a dequantization calculation section 9 for performing a dequantization calculation of a level of a coded coefficient represented by all or some of the bits of a code pattern of n bits inputted thereto, and an extraction pointer updating section 10 for updating an extraction pointer for the compressed code buffer 1 by a number equal to the number of effective bits used by the buffer address calculation section 8 and the dequantization calculation section 9 from among an inputted n-bit code pattern.

Figure 3:
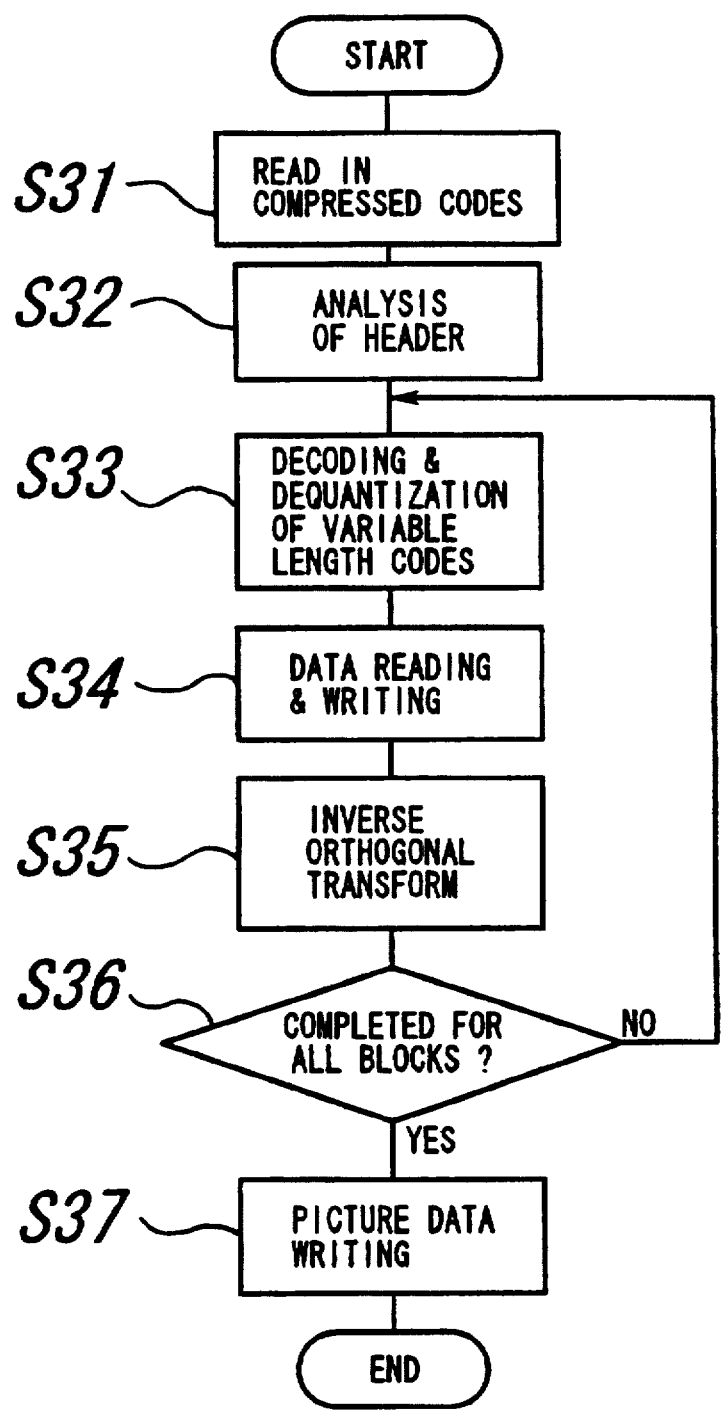
FIG. 3 is a flow chart illustrating an outline of a flow of picture data decompression processing of the picture data decompression apparatus of FIG. 1.

FIG. 3 illustrates an outline of a flow of picture data processing where the picture data decompression apparatus shown in FIG. 1 is employed. Referring to FIG. 3, variable length coded picture data are read in at step S31, and a header of the compressed picture data is analyzed to extract information necessary for picture data decompression such as a picture size, a number of blocks to be processed and so forth from the compressed picture data at step S32. Then at step S33, decoding and dequantization processing of variable length codes (VLCs) in units of one block of variable length codes is performed. Here, the picture data decompression apparatus shown in FIG. 1 is characterized in that, in order to assure high speed processing, m code patterns of n bits are decoded and dequantized simultaneously for the individual code patterns. At step S34, data after such dequantization are written for one block into a memory, and then, data to be used for inverse orthogonal transform are read out from the memory. The thus read out data are inverse orthogonal transformed at step S35. Then, the steps of operations from the decoding and dequantization processing of VLCs at step S33 to the inverse orthogonal transform processing at step S33 are repeated for all of the blocks extracted in the header analyzing processing at step S32, that is, the steps of operations are repeated until it is discriminated at step S36 that processing for all of the blocks has been completed. Then at step S37, the picture data for one frame are written into the frame memory, and then, the compressed picture data are decompressed.

In the following, an example of operation where the number n of code bits to be processed at a time is 9 bits, that is, a code pattern to be extracted from the compressed code buffer 1 by the module switching section 2 is 9 bits, will be described. In ordinary natural pictures, almost all data can be represented in codes of 9 bits or less.

A total of $2^9=512$ code patterns from "000000000" to "111111111" are represented with 9 bits. However, if any code pattern from among the 512 different code patterns which is not specified in the code table of the MPEG (Moving Picture Experts Group), which is the international standard for picture compression, but is somewhat common with but totally with another non-specified code pattern then these non-specified patterns are treated similarly. By contrast, code patterns which are specified in the code table of the MPEG are treated independently from the non-specified code patterns. The number of different code patterns of 9 bits or less specified in the code table of the MPEG is 177. This will be described with reference to FIG. 4. For example, with regard to four different code patterns (1) to (4) shown, the "111" pattern from the first to third bits and the "0111" pattern from the fourth to seventh bits, both commonly included in the code patterns, are specified in the code table of the MPEG. However, "00" of the eighth and ninth bits in the code pattern (1), "01" in the code pattern (2) and "11" in the code pattern (3) are not specified in the code table, and accordingly, the three code patterns (1), (2) and (3) are handled as a same single pattern although the eighth and ninth bits of them are different from one another. In contrast, since "10" of the eighth and ninth bits in the code pattern (4) is included in the code table, the code pattern (4) is determined as a single independent pattern.

Figure 6:
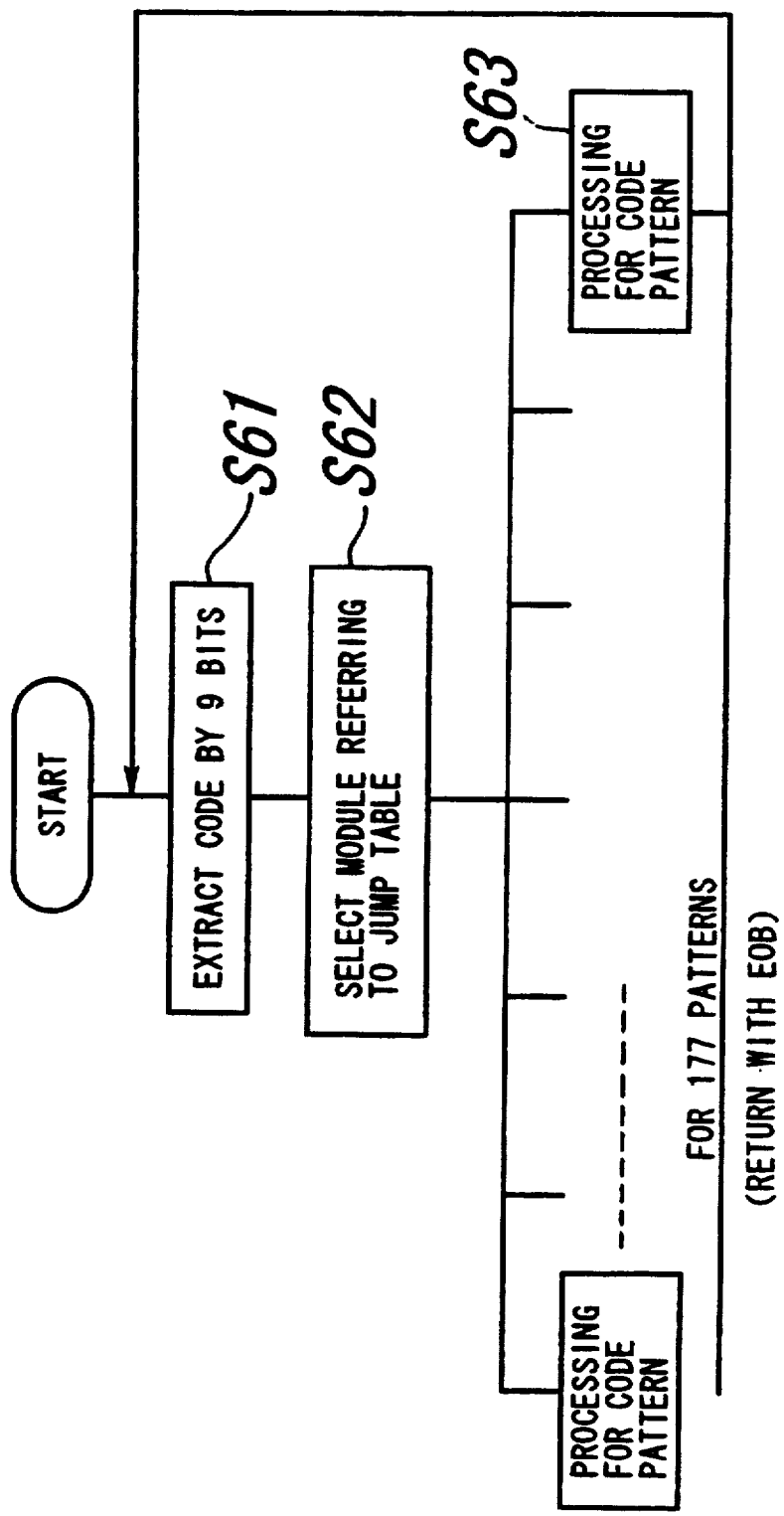
FIG. 6 is a flow chart illustrating a flow of processing of the picture data compression apparatus of FIG. 1 after a code pattern of 9 bits is extracted from a compressed code buffer until the code pattern is distributed to one of m decoding and dequantization modules.

According to the MPEG, since the 177 code patterns from among the 512 code patterns are significant, the decoding and dequantization modules 4 shown in FIG. 1 are provided by 177 in number in the present picture data decompression apparatus. Further, in the MPEG, 113 VLCs which appear frequently are prepared for a pair of a run and a level of a VLC. FIG. 5 shows some of such VLCs. From among the VLCs shown, those 26 VLCs which are composed of 9 bits or less can each be decoded and quantized, using only a VLC extracted by the module switching section 2, from a run and a level represented by the VLC since a code pattern extracted by the module switching section 2 is composed of 9 bits. Further, if a plurality of VLCs composed of 9 bits or less are included in a code pattern of 9 bits, then the VLCs can be processed at the same time. Furthermore, since the value of the level processed in each of the decoding and dequantization modules 4 is fixed, no multiplication need be performed newly upon dequantization, but a coefficient can be calculated only by bit shifting and addition. The calculation of a coefficient is given by the following equation:

coefficient = level (fixed in value for each routine) ×
quantization table value =
fixed value (±1 ~ ±6) ×
quantization table value FIG. 6 illustrates a flow of processing by the picture data decompression apparatus shown in FIG. 1. Referring to FIG. 6, in order to decode VLCs for one block, a code pattern of 9 bits is read in from the compressed code buffer 1 at step S61. Then at step S62, an address is extracted from the jump table 3 using the code pattern of 9 bits thus read in as an index, and one of the decoding and dequantization modules 4 designated by the address is selected from among the 177 decoding and dequantization modules 4. Then, at step S63, the code pattern of 9 bits is inputted to the thus selected decoding and dequantization modules 4 so that decoding and dequantization processing is performed for the code pattern. If the VLC ("10") representing an EOB (End of Block) is included in the code pattern, then the control sequence returns to step S61.

Figure 7:
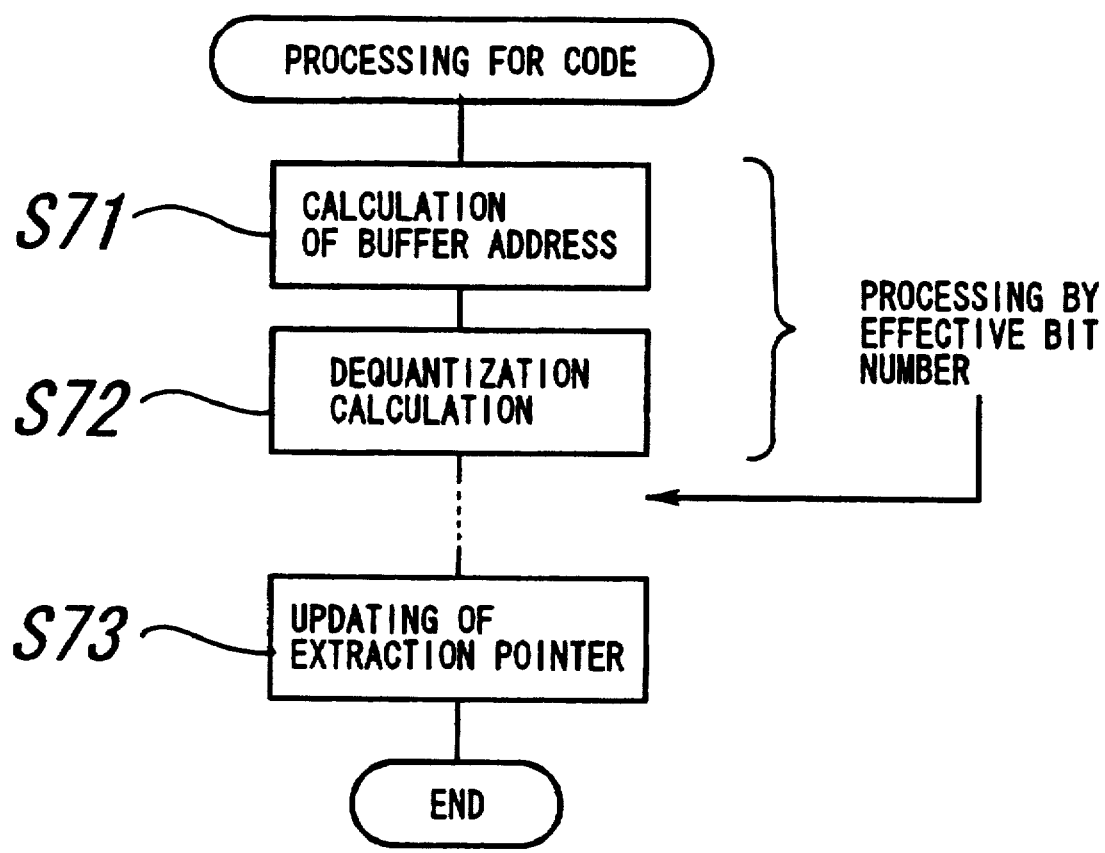
FIG. 7 is a flow chart illustrating a flow of processing by each of the decoding and dequantization modules shown in FIG. 6.

FIG. 7 illustrates a flow of processing by one of the decoding and dequantization modules 4.

Figure 8:
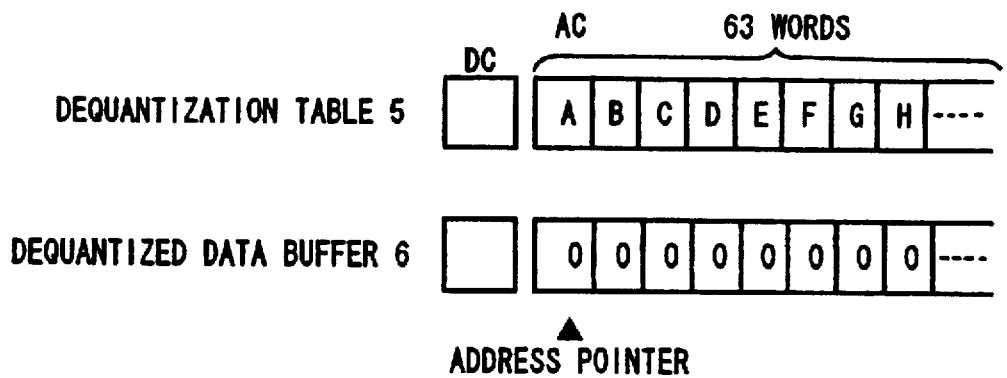
FIG. 8 is a diagrammatic view illustrating the relationship between a dequantization table and a dequantized data buffer in the picture data compression apparatus of FIG. 1.
Figure 9:
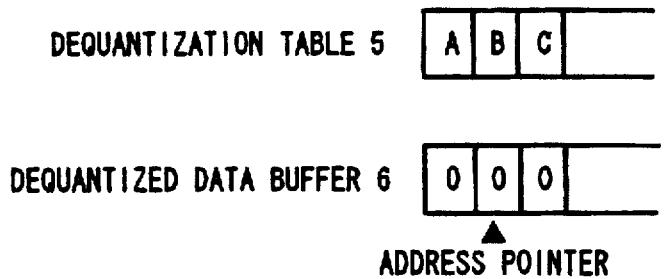
FIGS. 9(A), 9(B) and 9(C) are diagrammatic views illustrating different steps of processing performed by one of the decoding and dequantization modules shown in FIG. 6 in order of processing in a corresponding relationship to FIG. 8.
Figure 9:
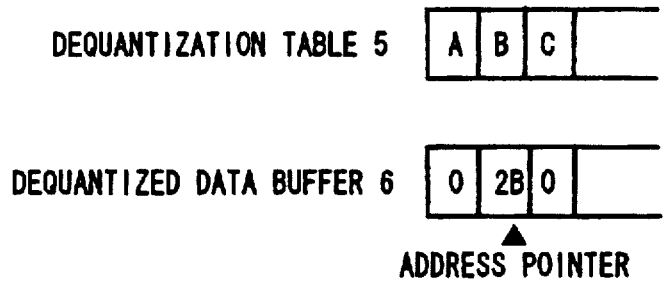
Figure 9:
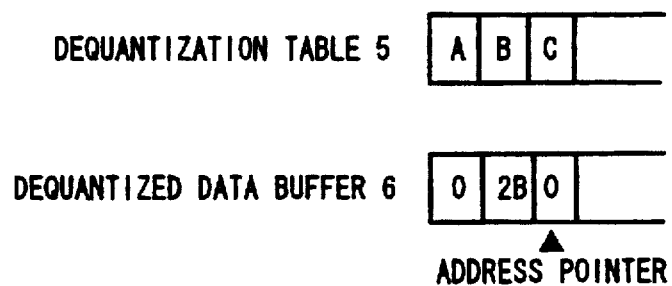

It is assumed that the code pattern of 9 bits extracted from the compressed code buffer 1 is, for example, "000110101" and the effective bit number of the VLC is 7 bits from the first to seventh bits, and when the run length represented by "0001101" of the 7 bits is "1" and the level of it is "2", the contents of the dequantization table 5 and the dequantized data buffer 6 regarding one block and an address pointer for them are such as illustrated in FIG. 8. In this instance, in one of the decoding and dequantization modules 4 which corresponds to the code pattern of 9 bits "000110101", since the run length of the VLC is "1", the address pointer is first incremented by "1" as seen in FIG. 9(A) by the buffer address calculation section 8 shown in FIG. 2 at step S71 illustrated in FIG. 7. In calculation processing for dequantization at next step S72, since the level is "2", a value ("B") of the dequantization table 5 designated by the address pointer is shifted one bit leftwardly (or multiplied by 2) by the dequantization calculation section 9 shown in FIG. 2, and a resultant value ("2B") is written into the corresponding address of the dequantized data buffer 6 as seen in FIG. 9(B), whereafter the address pointer is incremented as seen in FIG. 9(C). In pointer updating processing at next step S73, since the effective bit number thus processed is 7 bits, a read pointer for the compressed code buffer 1 is displaced 7 bits, thereby completing the processing by the selected decoding and dequantization module 4.

Figure 10A:
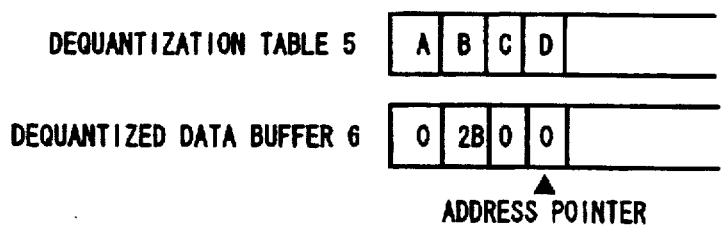
FIGS. 10(A), 10(B), 10(C) and 10(D) are diagrammatic views illustrating different steps of processing performed by one of the decoding and dequantization modules shown in FIG. 6 in order of processing in a corresponding relationship to FIG. 8.
Figure 10B:
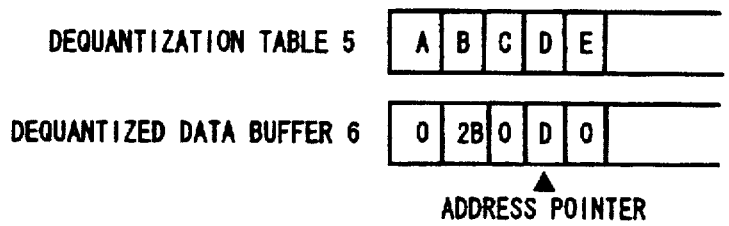
Figure 10C:
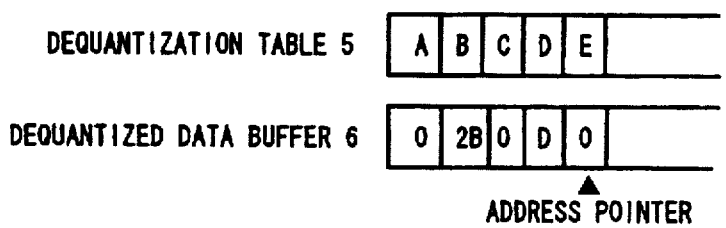
Figure 10D:
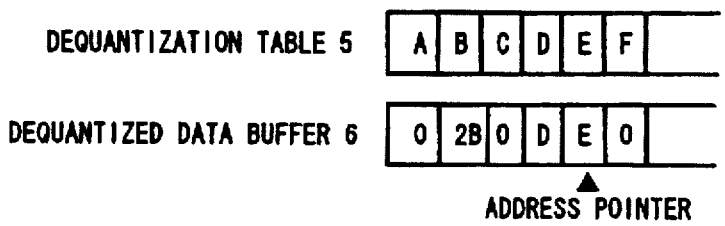

In contrast, it is assumed here that the code pattern of 9 bits extracted is "011011010" and includes three VLCs, and the run length represented by the first VLC of "0110" is "1" and the level of it is "1"; the run length of the second VLC of "110" is "0" and the level of it is "1"; and the last VLC of "10" is an EOB representing an end of the block, and the effective bit number of the code pattern is 9 bits. In this instance, first at step S71, since the run length of the first VLC is "1", the address pointer is incremented by 1 as seen in FIG. 10(A), and at next step S72, since the level of the first VLC is "1", a value ("D") of the dequantization table 5 designated by the address pointer is written as it is (multiplied by 1) into the dequantized data buffer 6 as seen in FIG. 10(B) and the address pointer is incremented as seen in FIG. 10(C). Further, since the run length of the second VLC is "0", the address is maintained, and since the level of the second VLC is "1", a value ("E") of the dequantization table 5 designated by the address pointer is written as it is (multiplied by 1) into the dequantized data buffer 6 as seen in FIG. 10(D). Then, since the third VLC is an EOB, the decoding and decompression processing of the one block is completed, and the address pointer is transferred to a buffer for a next block, and at step S73, the read pointer for the compressed code buffer 1 is displaced 9 bits, by which the processing has been completed, at step S73, thereby ending the processing illustrated in FIG. 7.

As described above, by processing decoding and dequantization of a variable length code at the same time, the value used for multiplication is fixed in any of the decoding and dequantization modules 4, and consequently, shifting and addition need not be used for calculation of a coefficient and, where the level is "1", no multiplication need be performed. Consequently, processing of one calculation operation for each one coefficient, which is required conventionally, can be eliminated, and accordingly, high speed processing can be performed even with a CPU (central processing unit) which does not include a multiplier.

Figure 11:
FIG. 11(A) is a diagrammatic view illustrating a writing order of data into the dequantization data buffer in the picture data decompression apparatus of FIG. 1.
FIG. 11(B) is a similar view but illustrating a reading out order of data from the dequantization data buffer.
Figure 12:
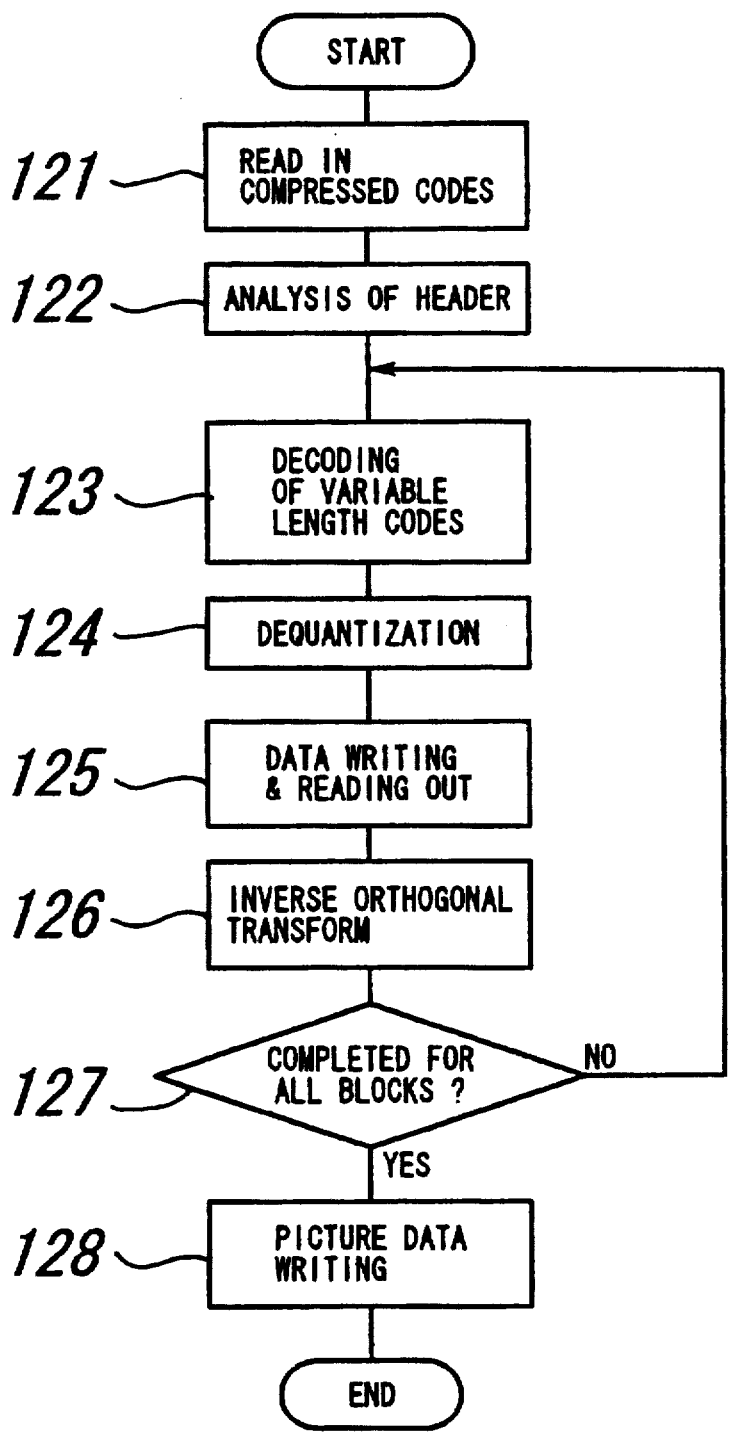
FIG. 12 is a flow chart illustrating an outline of a flow of conventional picture data decompression processing.
Figure 13:
FIG. 13 is a diagrammatic view illustrating a writing order and a reading out order of data in such conventional picture data decompression processing as illustrated in FIG. 12.

Further, in successive processing, in data writing and reading processing at step S34 of FIG. 3, data after decoding and dequantization processing of variable length codes are stored successively in order of coefficients calculated in the decoding and dequantization processing of the variable codes without performing scanning conversion as seen in FIG. 11(A). In inverse orthogonal transform processing at step S35 in FIG. 3 by the inverse orthogonal transform section 7, the data are read out from the dequantized data buffer 6 designating an address directly in order of numerical values illustrated in FIG. 11(B). Consequently, there is no need of performing scanning conversion upon writing. Further, since data are successively written into the dequantized data buffer 6, it is also possible to write a plurality of coefficients at the same time, and when compared with the conventional writing and reading processing illustrated in FIG. 13, since no address calculation processing of a memory is involved, higher speed processing can be achieved. On the other hand, since data are read out, also in the picture data decompression apparatus, at random similarly as in the conventional reading out processing, an equal processing time is required.

Having now fully described the invention, it will be apparent to one of ordinary skill in the art that many changes and modifications can be made thereto without departing from the spirit and scope of the invention as set forth herein.

What is claimed is:

1. A picture data decompression apparatus for decompressing compressed picture data, said compressed picture data being obtained by orthogonal transform, quantization and variable length coding of original picture data, comprising:

code pattern extraction means for extracting code patterns in units of n bits from the compressed picture data, n being an integral number greater than 1;

a plurality of decoding and dequantization means, each of said plurality of decoding and dequantization means being selectable to simultaneously decode and dequantize a code pattern from said code pattern extraction means; and inverse orthogonal transform means for inverse orthogonal transforming decoded and dequantized data from said plurality of decoding and dequantization means, wherein each of said plurality of decoding and dequantization means, decodes and dequantizes, from a code pattern of n bits extracted by said code pattern extraction means, predetermined variable length code patterns and wherein one of said plurality of decoding and dequantization means is selected based on the n-bit code pattern, wherein said code pattern extraction means includes:

a compressed code buffer for storing the compressed picture data;

a jump table including address information for each of said plurality of decoding and dequantization means, said jump table defining a corresponding relationship between the code patterns of n bits and said plurality of decoding and dequantization means; and a switching means for extracting the picture data stored in said compressed code buffer as a code pattern in units of n bits and inputting the extracted code pattern into corresponding one of said decoding and dequantization means referring to the address information of said jump table.

2. A picture data decompression apparatus as claimed in claim 1, further comprising a dequantized data buffer for storing decoded and dequantized data from said decoding and dequantization means, and wherein each of said decoding and dequantization means includes a buffer address calculation section for calculating a storage address to said dequantized data buffer from a run length of a coded coefficient represented by all or some of the bits of a code pattern of n bits inputted thereto, a dequantization calculation section for performing dequantization calculation of a level of a coded coefficient represented by all or some of the bits of a code pattern of n bits inputted thereto referring to a dequantization table, and an extraction pointer updating section for updating an extraction pointer for said compressed code buffer by a number equal to a number of effective bits used by said buffer address calculation section and said dequantization calculation section from within a code pattern of n bits inputted thereto.

3. A picture data decompression apparatus as claimed in claim 2, wherein each of said decoding and dequantization means performs storage into said dequantized data buffer in order of coded coefficients without performing scanning conversion, and said inverse orthogonal transform means reads out the stored data of said dequantized data buffer designating an address and performs inverse orthogonal transform processing of the thus read out data.

4. The picture data decompression apparatus for decompressing compressed picture data, said compressed picture data being obtained by orthogonal transform quantization and variable length coding of original picture data, comprising:

code pattern extraction means for extracting code patterns in units of n bits from the compressed picture data, n being an integral number greater than 1, wherein the n bits extracted correspond to one of: a non-specified code pattern and a specified code pattern according to the MPEG standard;

a plurality of decoding and dequantization means, each of said plurality of decoding and dequantization means being selectable to simultaneously decode and dequantize a code pattern from said code pattern from said code pattern extraction means; and inverse orthogonal transform means for inverse orthogonal transforming decoded and dequantized data from said plurality of decoding and dequantization means, wherein each of said plurality of decoding and dequantization means decodes and dequantizes, from a code pattern of n bits extracted by said code pattern extraction means, predetermined variable length code patterns, wherein non-specified code patterns having x bits in a common sequence, where x is less than n, are input to a first one of said plurality of said decoding and dequantization means and are treated similarly to each other, and wherein the specified code pattern having the same x bit common sequence as the non-specified code patterns but differing in n-x bits is input to a second one of said plurality of decoding and dequantization means.

* * * * *